United States Patent [19]

Brosh et al.

[11] Patent Number: 4,644,570

[45] Date of Patent: Feb. 17, 1987

[54] SENSOR AMPLIFICATION AND ENHANCEMENT APPARATUS USING DIGITAL TECHNIQUES

[75] Inventors: Amnon Brosh, Montvale; Wolf S. Landmann, Fairlawn, both of N.J.

[73] Assignee: Bitronics, Inc., Montvale, N.J.

[21] Appl. No.: 778,230

[22] Filed: Sep. 20, 1985

[51] Int. Cl.$^4$ ............................................. G01M 3/00
[52] U.S. Cl. ...................................... 377/17; 377/39; 307/265
[58] Field of Search .................... 377/17, 39, 44, 45; 307/265

[56] References Cited

U.S. PATENT DOCUMENTS

4,336,512 6/1982 de Vries ............................... 307/265

Primary Examiner—John S. Heyman
Assistant Examiner—K. Ohralik
Attorney, Agent, or Firm—Arthur L. Plevy

[57] ABSTRACT

There is disclosed a digital enhancement circuit which responds to the complementary inductance provided by a planar coil sensor which inductance varies in a complementary manner according to the position of a movable member associated with the planar coil configuration. The complementary inductance is coupled to an oscillator whereby the period of the oscillator is varied in a first mode according to a first inductance value and in a second mode according to a second inductance value. These signals are then processed by means of digital processing circuitry to develop a signal indicative of the difference of the periods as divided by the sum of the periods. This signal is a ratiometric signal, and by employing digital counters, one can provide an output signal having a predetermined gain factor and having the above noted ratiometric characteristic which signal is indicative of the position of the movable member as further enhanced by the gain factor.

20 Claims, 4 Drawing Figures

SIDE VIEW FIG. 1A

SENSOR AMPLIFICATION AND ENHANCEMENT APPARATUS USING DIGITAL TECHNIQUES

BACKGROUND OF THE INVENTION

This invention relates to digital processing apparatus for sensors and more particularly to a digital interface apparatus which provides output amplification and enhancement for sensing elements which operate in a certain frequency mode such as planar coil position sensors.

Planar coils have been described in various patents which have been assigned to the assignee herein and which patents describe planar coil configurations which are non-contacting sensors. See for example U.S. Pat. No. 4,507,638 which issued on Mar. 26 1985 to Amnon Brosh, a co-inventor herein, and entitled ROTARY POSITION SENSORS EMPLOYING PLANAR COILS.

In the above noted patent there is described in THE BACKGROUND OF THE INVENTION various other patents which pertain to the planar coil sensors to be described herein. The techniques to be described have broader applications to other types of sensors. It is a purpose of this invention to achieve amplification of sensor output without utilizing typical amplifier circuits which exist in the prior art. Many such sensors have their outputs amplified by operational amplifiers or other linear circuits.

There are, of course, certain obvious advantages which will be achieved by this invention for obtaining amplification using digital techniques as compared to amplification using analog techniques. As is known in the prior art, the amplifier is a relatively critical component. For example, such amplifiers are associated with thermal errors which affect the offset and the gain performance of the amplifier and which errors contribute to overall sensor errors. Furthermore, in order to use operational amplifiers and other linear amplification circuits, several precision resistors have to be used in conjunction with the IC's Such amplifiers are also associated with EMI susceptability which results in output errors.

Generally, linear circuits such as operational amplifiers employ a different and more costly manufacturing technology than digital circuits. Digital circuits which consist of various digital components such as gates, flip flops, counters and other similar devices are less costly to manufacture. The purpose of this invention is to use digital techniques exclusively to drive, to detect and to amplify the sensor output. As is well known, by using digital techniques exclusively, one can achieve a custom integrated circuit made by gate arrays or custom chip techniques at a much more economical cost and by simpler procedures than linear circuits or linear-digital circuit combinations.

Hence it is the object of the present invention to achieve amplification of sensor output while eliminating operational amplifiers or other linear circuits.

It is a further object of this invention to provide a digital circuit which processes the sensor output to provide an amplified signal indicative of the position of a movable member as coupled to a planar coil sensor assembly.

As will be explained, these objects are achieved by employing a digital circuit whereby performance enhancement is also attained due to the fact that the sensor circuit output is a ratio of the difference between two frequency terms divided by their sum. This causes first order thermal and stability errors to cancel out and also results in the cancellation of second order non-linearity errors. The output of the digital circuit is ratiometric with respect to the supply voltage, a feature which is critical when ratiometric analog-to-digital convertors are used in conjunction with the sensor.

Furthermore, by using the circuitry to be described, offset and span adjustment is implemented by utilizing digital techniques whereby adjustment is provided by employing binary numbers. This feature is highly desirable in sensors and sensor interface circuits since prior art adjustments are based on trimming resistors techniques on line which are costly and expensive.

BRIEF DESCRIPTION OF THE PREFERRED EMBODIMENT

Sensor amplification and enhancement apparatus for obtaining an amplified enhanced output from a sensor, indicative of the position of a movable member, comprising complementary impedance means coupled to said member to provide a first impedance and a second complementary impedance for each movable position of said member, whereby as one impedance increases by a given amount due to said movement, the other decreases by the same given amount, means including an oscillator responsive to said first and second impedances to provide first and second signals each having a different period determined according to the magnitude of said first and second impedances, digital logic means responsive to said first and second signals for providing an output signal indicative of the difference in duration of said periods as divided by the sum of said periods and including means for expanding the duration of said signal to provide an expanded output signal having an effective gain factor according to the degree of expansion.

BRIEF DESCRIPTION OF THE FIGURES

FIG. 2A is a perspective plan assembly view of the coil of FIG. 1A.

DETAILED DESCRIPTION OF THE FIGURES

Figure 1A:
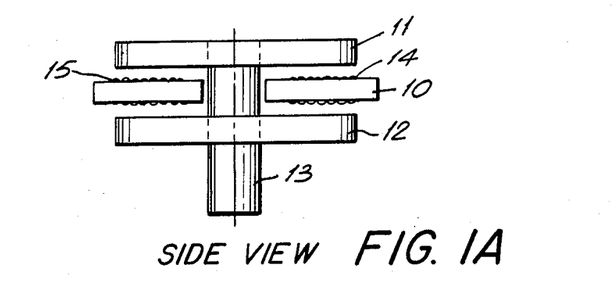
FIG. 1A is a side view of a complementary coil configration employed in this invention.

Referring to FIG. 1A, there is shown a rotary position sensor which employs a central board 10 having located on the surface planar coil configurations 14 and 15.

The planar member 10 is a printed circuit board employing conventional printed circuit materials such as glass or cloth filled epoxy boards, Teflon, or a paper base phenolic composition. It is, of course, understood that many materials can be employed for the circuit board 10 as are presently used to fabricate conventional printed circuits as well as those structures which are employed in the fabrication of thick and thin film circuits. As indicated, mounted on the board 10 are coil configurations 14 and 15. The coil is etched, stamped, printed or plated on the planar base member 10, and a suitable conductor material such as copper is used to construct the coil according to conventional printed circuit techniques.

Figure 1B:
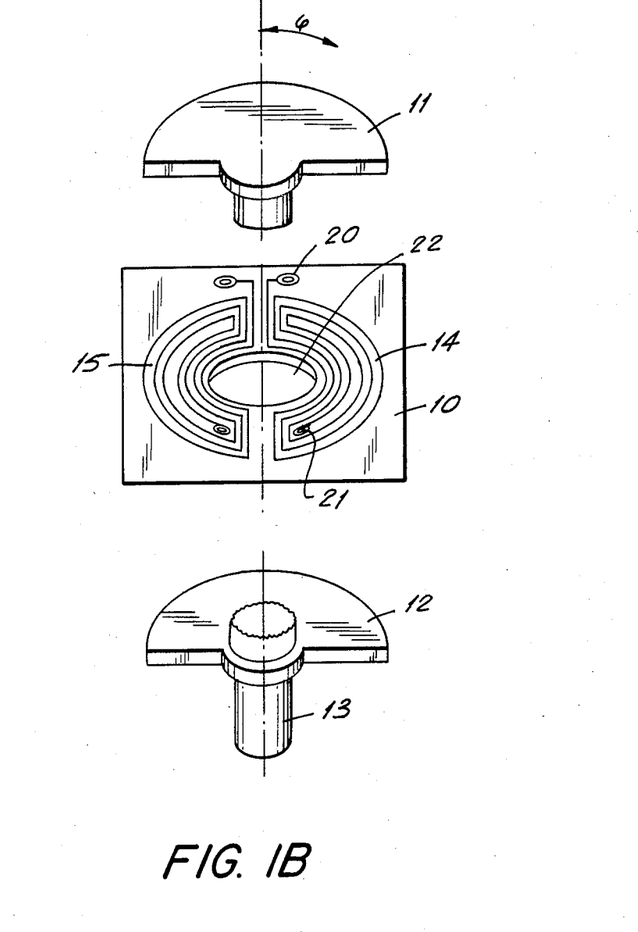
FIG. 1B is an exploded view of a complementary coil configurtion employed in this invention.

FIG. 1B shows a more detailed version of the board 10 having imprinted thereon semi-circular coil configurations 14 and 15.

Each coil configuration as 14 and 15 is of an identical construction having the same number of turns and the same shape. Each coil configuration is associated with first and second terminals as 20 and 21 for coil 14. The coil configuration shown in FIG. 1B is implemented on the top and bottom surface of the board 10, and the coil configurations on the top and bottom surfaces are of a congruent configuration.

As seen both from FIGS. 1A and 1B, there is a central shaft 13 which shaft is directed through the central aperture 22 of the planar coil board and which shaft is associated with a top conductive metal member 11 and a bottom conductive metal member 12. Each member as 11 and 12 are coupled to the shaft such that as the shaft is rotated, the members 11 and 12 are also rotated. The planar coil board member 10 is stationary with respect to shaft movement. The members 11 and 12 can be referred to as spoiler members and, as indicated, are attached to the shaft 13 and placed symmetrically on both sides of the board 10.

The spoiler members may be made of conductive material or may constitute closed loop coil structures. See for example, U.S. Pat. No. 4,425,511 entitled PLANAR COIL APPARATUS EMPLOYING A STATIONARY AND A MOVABLE BOARD issued on Jan. 10, 1984 to Amnon Brosh, a co-inventor herein. This patent shows examples of shorted coil configurations used as spoiler members. As seen from FIG. 1B, the spoiler members 11 and 12 are semi-circular configurations which as indicated above can be fabricated from a conductive material which material affects a magnetic field or can be fabricated from a planar board configuration having deposited thereon a shorted coil. The shorted coil will be oriented in the same manner as the planar coil members 14 and 15 and of the same configuration.

As one can see from FIGS. 1A and 1B, as the shaft 13 is rotated, the spoiler members 11 and 12 rotate as they are rigidly secured to the shaft. Rotation of the shaft causes the members 11 and 12 to cover or uncover portions of the coils 14 and 15 in a complementary manner. What is meant by this is that the principal of operation is based on the modulation of the coil inductances as a result of the spoilers angular position or as a result of the position of the shaft. As the shaft 13 is rotated through a predetermined angle, the spoilers 11 and 12 overlap more area of coil 14, for example, and less area of coil 15. Since the shapes of the coils 14 and 15 are identical, the increase in the covered coil area of one coil is the same as the decrease in the covered of coil area in the other coil. The change of inductance of the two coils due to shaft rotation is therefore completely complementary.

As will be explained, the coils are multiplexed so that only one coil 14 or 15 is in the oscillator circuit and operating at one time to provide pulses with a frequency indicative of the coil inductance as modulated by the spoiler position. Coupling between the two coils is not required based on this scheme of operation. As will be explained, the coils are constructed to achieve a smooth and monotonic operation in the semi-circular range of the coil pattern which consists of most of the coil excluding the coil ends having the straight line sections. Of course, the rotation can be controlled mechanically or otherwise so that the rotation limits of the shaft can be controlled according to the coil pattern to provide operation within the monotonic and linear range.

The advantage of the dual spoiler construction as shown in FIGS. 1A and 1B is that it provides change in coil inductances and hence in pulse frequency in response to angular position only. Transverse motions such as axial shaft motion or lateral motion as motion from side to side have relatively small effects due to the rejection of such effects inherent to dual spoilers which are symmetrically placed on both sides of the coils.

The period T1 of the square wave generated by the oscillator 30 while operating in conjunction with inductance L1 and capacitor C is:

$$T1 = 2\pi \sqrt{L1\, C}$$

The period T2 of the square wave generated by oscillator 37 while operating in conjunction with inductance L2 and capacitor C is:

$$T2 = 2\pi \sqrt{L2\, C}$$

When the shaft is positioned at coil symmetry position so that the spoilers overlap identical areas of coils L1 and L2, both inductances are equal, hence:

L1=L2=Lo

Typical value of Lo is 5 microhenry. Capacitor C value of 200 to 300 pico-farad is normally used.

The value of the pulse period To and frequency Fo at coil symmetry position is:

$$To = 2\pi \sqrt{Lo\, C} \simeq 0.2 \text{ microsecond}$$

$$Fo = \frac{1}{To} \simeq 5 \text{ MHz}$$

L1 and L2 variation in value when rotated from null to full scale is typically 1 microhenry, which gives a value at full scale deflection $$\frac{\Delta L}{Lo} = \frac{1}{5} = 0.2$$

As a result, $$\frac{\Delta T}{To} = \simeq 0.1$$

If conventional F/V convertor (frequency to voltage conversion) techniques were used to convert the oscillator 30, frequencies to an analog DC voltage, the differential output voltage for a change in frequency of 0.1 assuming a 5 V power supply, is:

Vout=5×0.1=0.5 V

It is clear that if the sensor is required to provide a full scale output greater than 0.5 V, such as 5 V for example, an amplification of 10 must be incorporated in the sensor to amplify the 0.5 V to 5 V.

At present, operational amplifiers and other linear circuits are the most commonly used means for amplifying the outputs of sensors and transducers.

This invention describes a method for amplification of planar sensors output which is based on the fact that, as explained earlier, the sensors are operated in a multiplexed, complementary variable frequency mode and, therefore, lend themselves to a novel digital processing technique which results in output amplification without resorting to operational amplifiers or other linear circuits.

Figure 2:
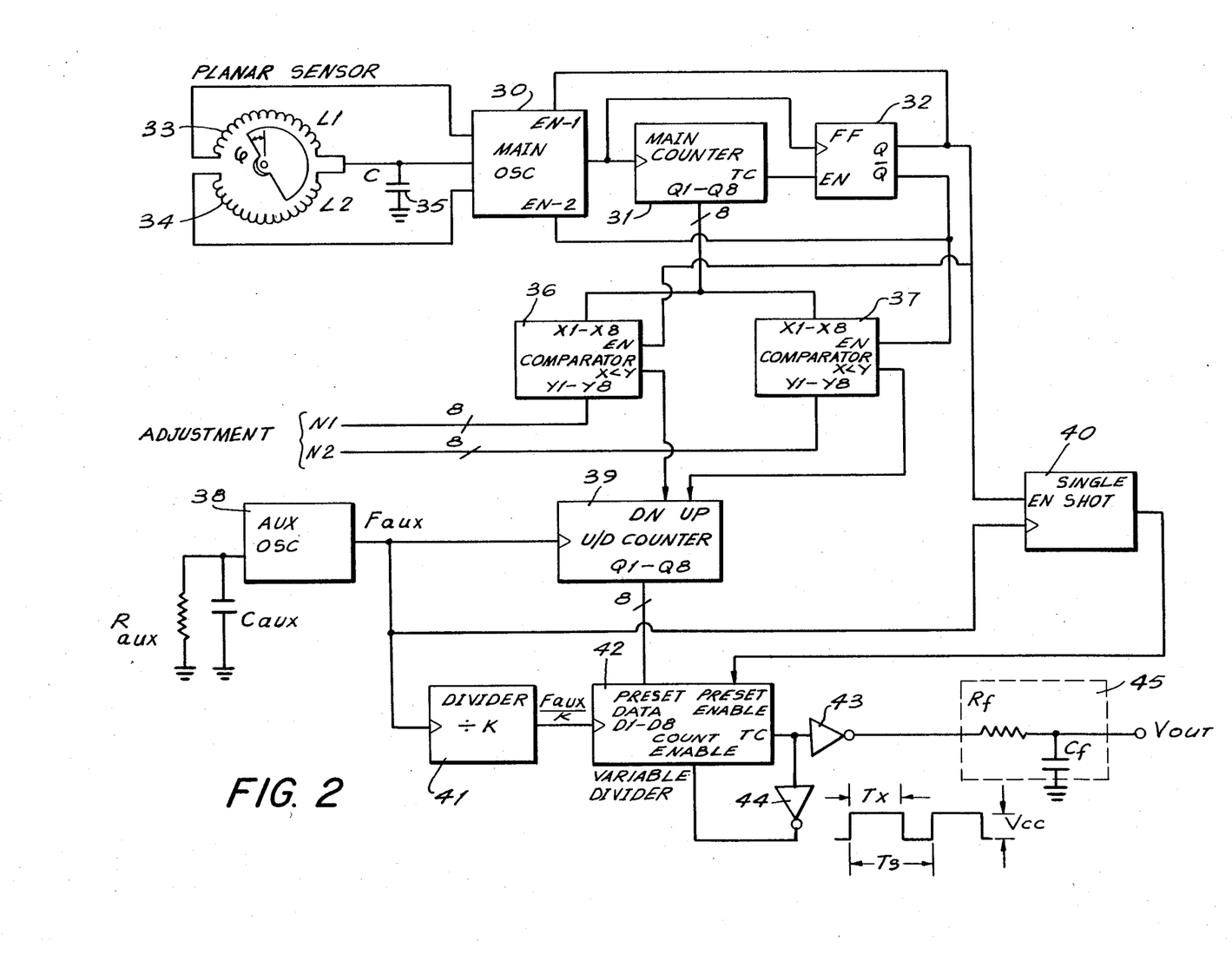
FIG. 2 is a detailed block diagram depicting digital circuit apparatus for providing signal enhancement and amplification utilizing a complementary coil.

FIG. 2 describes one such arrangement based on expanding the width of the output pulses, such pulse width being indicative of the difference between the periods of oscillator 30 operating in conjunction with complementary coils 33 and 34, by a factor K-so that when such output pulses are passed through a low pass filter, their average DC content is increased by the same factor K.

Factor K is, therefore, the amplification factor which is realized using digital processing exclusively by means of gates, counters and other standard digital blocks. As can be seen, factor K which is the division factor of divider 41, can be selected to provide the necessary gain factor required to obtain an output swing from null to full scale up to the full value of the power supply rail-to-rail swing. It can also be seen that such errors as thermal drifts, instability, feedback resistor errors, etc. normally found in amplifier circuits are eliminated in this arrangement due to its purely digital nature.

Referring to FIG. 2, the following is the mode of operation of each block; MAIN OSC. 30 when enabled in EN-1 (EN-1 input is high) will generate a square wave with a period T1 determined by the capacitor 35 (C) and coil 33 (L1). When enabled in mode EN-2, will generate a square wave with a period T2 determined by the capacitor 35 (C) and coil 34 (L2). Hence $$T1 = 2\pi \sqrt{L1 \cdot C}$$

$$T2 = 2\pi \sqrt{L2 \cdot C}$$

MAIN COUNTER 31: This counter is advanced for each pulse generated by the MAIN OSC 30, from zero until it reaches its terminal count state N, when it resets itself. Any new clock pulses will eventually advance this counter in the same sequence.

FLIP FLOP 32: This block is toggled by the terminal count output of the MAIN COUNTER 31. As a result, assuming the initial state of the MAIN COUNTER 31 and FLIP FLOP 32 being zero, the MAIN OSC 30 generates N pulses with the period T1 (coil L1 is selected) after which the MAIN COUNTER 31 reaches its terminal count state, resets itself and toggles the FLIP FLOP 32. Now L2 is selected and the period of pulses generated by the MAIN OSC 30 is T2 and additional N pulses are counted until the MAIN COUNTER 31 reaches its terminal count state, and again the FLIP FLOP 32 is toggled.

AUXILIARY OSC 38: This is an RC oscillator with the frequency Faux and the period Taux determined by the external components Raux and Caux.

DIVIDER 41: Generate pulses with a period K.Taux.

COMPARATORS 36 AND 37: When enabled, the comparators provide a high output when its X1–X8 inputs represent a number less than the number at the Y1–Y8 inputs.

UP-DOWN COUNTER 39: When enabled in the DOWN or UP mode, will be advanced, in the DOWN or UP direction accordingly, by each pulse generated by the auxiliary oscillator 38.

VARIABLE DIVIDER 42: This is a counter clocked by the divider 41 from its preset state, which is provided by data inputs D1–D8 from counter 39, until terminal count is reached, when it is preset again and the cycle is repeated.

FILTER 45: This external block attenuates the AC component of the output pulses generated by variable divider 42, and inverted by inverter 43, and provides a DC component which is a function of the supply voltage Vcc times the duty cycle of the pluses.

The mode of operation is as follows:

Initially, the flip flop 32 is in zero state and coil 33 (L1) is selected which makes the period of oscillator 30 T1. The main counter 31 is advanced during N pulses, which take a time of N.T1, after which it reaches terminal count state, resets itself and toggles the flip flop 32. Now coil 34 (L2) is selected and the period of oscillator 30 is T2. After N pulses of T2, which take a time of N.T2, the flip flop 32 toggles again and coil 33 is selected again. This operation continues with the oscillator switching from coil to coil. The period of one complete cycle, consisting of N pulses of T1 and N pulses of T2 is:

$$Ts = N(T1 + T2)$$

After each such cycle, single shot 40 is toggled once to preset enable the counter 42 as will be seen later. During the time that counter 31 is counting pulses of T1, comparator 36 is enabled and it sets counter 39 in a DOWN counting mode for N1 pulses of T1 or N1.T1. Similiarly, when counter 31 is counting pulses of T2, comparator 37 is enabled and it sets counter 39 in an UP counting mode for N2 pulses of T2, or N2.T2. The digital numbers N1 and N2 are used for offset and sensitivity adjustments as will be seen later.

During the time that counter 39 is in the DOWN counting mode, it is advanced in the DOWN direction by the auxiliary oscillator 38 pulses with the frequency Faux. Hence $$Ndown = (N1.T1) \text{ Faux}$$

Similiarly, the number of UP pulses are:

$$Nup = (N2.T2) \text{ Faux}$$

The remaining count in counter 39, after each down up cycle, is:

$$\Delta N = (-N1.T1 + N2T2) \text{ Faux}$$

The count $\Delta N$ is used to preset the variable divider 42, via preset data lines D1–D8.

Preset enable signal comes from the signal shot 40 which toggles once at the end of each complete cycle of the flip flop 32. Therefore, each pulse period is:

$$Ts = N(T1 + T2).$$

The count enable input of variable divider 42, which is provided by inverter 44, causes counter 42 to be clocked by divider 41, at the frequency of Faux/K from the preset count D1–D8 (which is equal to ΔN) until the terminal count state is reached.

The counters 39 and 42 have the same number of bits and N1.T1 is always greater than N2.T2, thus the number ΔN in the above equation appears as its complement number, and as a result, when used to present preset counter 42, the number of counts required for 42 to reach its terminal count will be:

$$Nx = -\Delta N = (N1.T1 - N2.T2) \, Faux$$

The time Tx required to clock counter 42 for Nx counts using the rate of pulses provided by divider 41 is:

$$Tx \frac{Faux}{K} = Nx$$

or $$Tx = \frac{KNx}{Faux} = K(N1 \cdot T1 - N2 \cdot T2)$$

Thus the pulses appearing at the input to filter 45 have a width of Tx and a frequency, or repetition rate, as established by single shot 40, of N(T1+T2). After filtering, the DC voltage average at Vout terminal is:

$$Vout = Vcc \frac{Tx}{Ts} = Vcc \frac{K(N1 \cdot T1 - N2 \cdot T2)}{N(T1 + T2)}$$

or $$Vout = Vcc \, K \frac{N1 \cdot T1 - N2 \cdot T2}{N(T1 + T2)}$$

Since the sensor design and coil layout is symmetrical and complementary, an increase of ΔL in one coil will result in a decrease of the same magnitude ΔL in the second coil. Hence:

$$L1 = Lo + \Delta L$$

$$L2 = Lo - \Delta L$$

or, in terms of pulse periods $$T1 = To + \Delta T$$

$$T2 = To - \Delta T$$

If these values for T1 and T2 are inserted in the above equation for Vout it takes the following form:

$$Vout = \frac{Vcc}{2N} \cdot K \cdot \left[ (N1 + N2) \frac{\Delta T}{To} + (N1 - N2) \right]$$

As can be seen, Vout is controlled by the value of K. An increase in K will result in an increase of Vout, independently of the values of Vcc, N and ΔT/Tc, which is the same affect that an operational amplifier would have if it were used. The formula demonstrates how digital amplification is accomplished without the use of an amplifier.

As can also be seen from the above formula for Vout, the offset of output voltage can be independently trimmed by the selection of the number (N1−N2) and the sensitivity can be independently trimmed by the selection of the number (N1+N2). Since both N1 and N2 are digital numbers as is evident from FIG. 2, the sensor offset and sensitivity trimming can be performed digitally which is another aspect of this invention. In addition, since T1 and T2 appear in the formula as a ratio of their difference divided by their sum, thermal and oscillator error cancellation, as well as a linearity enhancement take place.

It can also be seen that Vout is directly ratiometric with respect to Vcc, which is another feature of this invention.

Finally, the auxiliary oscillator frequency does not appear in the formula for Vout, since it cancels out, and as a result, the circuit performance is independent of the auxiliary oscillator errors.

Figure 3:
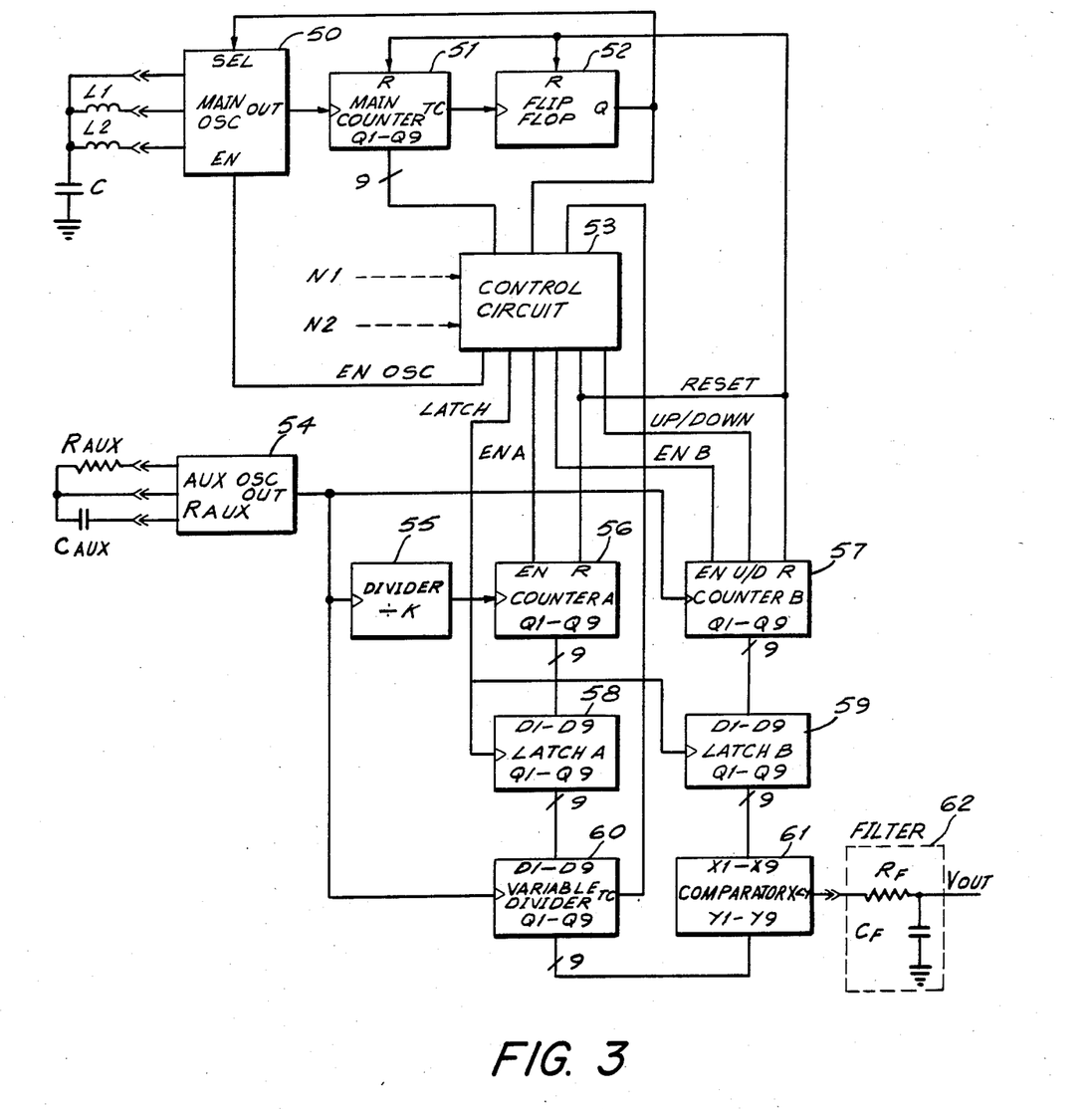
FIG. 3 is a detailed block diagram of an alternate embodiment according to this invention.

FIG. 3 describes another version of the digital amplification scheme whereby the time base, or frequency, of the output pulses is being decreased by a ratio K so that when such output pulses are passed through a low pass filter, their average DC content is increased by the same factor K.

There are certain advantages of the arrangement shown in FIG. 3 over the one shown in FIG. 2. For example, the output pulse frequency is greater by a factor K which makes filtering easier and results in a better response time. In addition, since the main oscillator is being turned off after each measurement cycle, the average current consumption is reduced.

Referring to FIG. 3, the mode operation of individual blocks is as follows:

MAIN OSCILLATOR 50: When enabled (ENABLE input=HIGH) This block generates a square wave with a period determined by the capacitor C and one of the coils L1 or L2 depending on the level at the SELECT input, e.g. When SELECT input is LOW, the coil L1 is selected and the period is T1=2π√L1.C. When the SELECT input is HIGH, coil L2 is selected and the period is T2=2π√L2.C. When the ENABLE input is LOW, the MAIN OSC 50 goes into a high impedance state and its operation, as well as that of the MAIN COUNTER 51 and FLIP FLOP 52, ceases.

MAIN COUNTER 51: This counter is advanced for each pulse generated by the MAIN OSC 50, from zero until it reaches its terminal count state N, when it resets itself. Any new clock pulses will eventually advance this counter in the same sequence.

FLIP FLOP 52: This block is toggled by the terminal count output of the MAIN COUNTER 51. As a result, assuming the initial state of the MAIN COUNTER 51 and FLIP FLOP 52 being zero, the MAIN OSC 50 generates N pulses with the period T1 (coil L1 is selected) after which the MAIN COUNTER 51 reaches its terminal count state, resets itself and toggles the FLIP FLOP 52. Now L2 is selected and the period of pulses generated by the MAIN OSC 50 is T2 and another N pulses are counted until the MAIN COUNTER 51 reaches its terminal count state, and again the FLIP FLOP 52 is toggled.

AUXILIARY OSC. 54: This is an RC oscillator with the period Taux determined by the external components Raux and Caux.

DIVIDER 55: Generate pulses with a period of K.Taux.

COUNTER A 56: If enabled by the CONTROL CIRCUIT 53 via the EN line, it is advanced by each pulse generated by the DIVIDER 55. When not enabled, it does not change state. The RESET input brings this counter to its zero state.

COUNTER B 57: This counter is clocked by the AUX OSC 54. When enabled by the CONTROL CIR- CUIT 53 via EN B line, it counts UP or DOWN, depending on the status of the UP-DOWN line. When not enabled, it does not change state. The RESET line overrides all other inputs and brings the counter to its zero state.

LATCH A 58 and LATCH B 59: The status of the D1-D9 lines is transferred to the Q1-Q9 outputs on the positive going edge of the clock generated by the CONTROL CIRCUIT 53 (LATCH line). When this line is HIGH or LOW, the outputs do not change states.

VARIABLE DIVIDER 60: This is a counter clocked by the AUX OSC 54 from zero until it reaches a state which equals the state of the data inputs D1-D9, when it is reset and this cycle is repeated. As a result, the period of this counter will be the period of the AUX OSC 54, Taux times the number NA stored in LATCH A 58.

COMPARATOR 61: The output of this comparator is HIGH only when the data at the X1-X9 inputs represents a number greater than the number at the Y1-Y9 inputs.

Assuming that the data stored in LATCH A 58 and LATCH B 59 is NA and NB respectively, the period of the pulse generated by the COMPARATOR 61 will be the same as the period of the VARIABLE DIVIDER 60, which is NA.Taux. The width of the output pulse will be NB.Taux, because the output will be HIGH only for those states of the VARIABLE DIVIDER 60 which are less than NB, i.e. for states 0, 1, 2 ... NB-1. This results in a duty cycle $D = NB/NA$.

FILTER 62: This external block attentuates the AC components of the output pulse generated by COMPARATOR 61 and leaves unchanged the DC component. The DC component is given by the supply voltage Vcc times the duty cycle D, which results in an output voltage Vout=Vcc. NB/NA.

2. MODE OF OPERATION

Initially, the MAIN OSC 50 is disabled. At a certain moment, the CONTROL CIRCUIT 53 resets (via the RESET line) the MAIN COUNTER 51, the FLIP FLOP 12, the COUNTER A 56 and COUNTER B 57.

Next, via the ENABLE OSC line, the MAIN OSC 50 is enabled, and because the FLIP FLOP 52 is in the zero state, the coil L1 is selected, which makes the period of oscillation $T1 = 2\pi\sqrt{L1.C}$. The MAIN COUNTER 51 is advanced during N pulses, which takes a time N.T1, after which it reaches its terminal count state, resets itself and toggles the FLIP FLOP 52. Now coil L2 is selected, the period of the MAIN OSC 50 is $T2 = 2\pi\sqrt{L2C}$ after additional N pulses, which take a time of N.T2, the FLIP FLOP 52 is toggled again and the CONTROL CIRC 53 disables the MAIN OSC 50. This concludes one measurement cycle.

During all the time when the MAIN OSC 50 was enabled (N.T1+N.T2) the COUNTER A 56 is also enabled via the EN A line, and since its clock period is K.Taux, it reaches a final count $NA = (N.T1 + N.T2)/K.Taux$.

During the N.T1 time, COUNTER B 57 is counting up (via UP/DOWN line) and it is enabled only for N1 periods of the MAIN OSC 50. Because the clock period is Taux, the state reached by this counter is N1.T1/Taux.

Next, during the N.T2 period, the COUNTER B 57 is in the DOWN mode and enabled only for N2 periods of the MAIN OSC 50. This results in a final count NB:

$$NB = \frac{N1 \cdot T1}{Taux} - \frac{N2 \cdot T2}{Taux} = \frac{N1 \cdot T1 - N2 \cdot T1}{Taux}$$

The numbers NA and NB are respectively stored in the LATCH A 58 and LATCH B 59. As described previously, the VARIABLE DIVIDER 60 and the COMPARATOR 61 will generate a train of pulses at the output of the comparator with a duty cycle D=NB/NA. The FILTER 62 will produce a DC voltage Vout=Vcc. NB/NA.

$$Vout = Vcc \cdot K \frac{N1 \cdot T1 - N2 \cdot T2}{N(T1 + T2)}$$

The MAIN OSC 50 is enabled again after a predetermined number of pulses generated by the VARIABLE DIVIDER 60. This repeats the measurement cycle described above. A new set of numbers NA and NB is generated with which the LATCH A 58 and LATCH B 59 are updated.

The time interval between two consecutive cycles of measurement is determined by two considerations:

decreasing this time (faster updating) increases the DC power consumption of the MAIN OSC 50.

increasing this time reduces the speed of response of the transducer.

Depending on the application, an optimum value is chosen. Reviewing the Vout formula obtained above, it can be seen that it is identical to the Vout formula obtained for the circuit of FIG. 2. The main difference is in the pulse frequency.

For the circuit of FIG. 3, the pulse period is given by the time required to reach the count NA using the auxiliary oscillator 54 with a period Taux. Hence:

$$Ts = NA \cdot Taux = \frac{N \cdot T1 + N \cdot T2}{K \, Taux} \cdot Taux = \frac{N(T1 + T2)}{K}$$

When compared to the pulse period in FIG. 2 which was:

$$Ts = N(T1 + T2)$$

The period of the circuit of FIG. 3 is K times shorter than the period of the circuit of FIG. 2, and therefore the pulse frequency is faster by K. This is an advantage since all other factors being equal, the higher pulse frequency enables a faster frequency response of the sensor.

Numerical example:

Coil inductance Lo=5 microhenry

Full scale change in each coil inductance for=45° rotation from the symmetry point ΔLm=0.5 microhenry Circuit capacitor C=200 pico-farad Hence symmetry point pulse period and frequency are:

$$To = 2\pi \sqrt{Lo \cdot C} = 2\pi \sqrt{5 \times 10^{-6} \times 200 \times 10^{-12}} \approx 0.2 \, \mu s$$

$$Fo = \frac{1}{To} \approx 5 \, MHz$$

and full scale change in pulse period $$\Delta Tm = \pm 2\pi \sqrt{\Delta Lm \cdot C} =$$

$$\pm 2\pi \sqrt{0.5 \times 10^{-6} \times 200 \times 10^{-12}} \cong 0.01 \ \mu s$$

$$\frac{\Delta Tm}{To} = \pm 0.05$$

Select N=1024
Vcc=5 VDC
Assume sensor must provide a 0 to 5 VDC output for 0°
To 90° (45° from the symmetry point) rotation.
Selection of amplification factor K, N1, N2:

$$V\text{out} = \frac{Vcc}{2N} \cdot K \cdot \left[ (N1 + N2) \frac{\Delta T}{To} + (N1 - N2) \right]$$

If K=11 is selected, then N1 and N2 can be computed based on the following relationships:

At 0° where $\frac{\Delta Tm}{To} = -0.05$, the output is 0

At 90° where $\frac{\Delta Tm}{To} = +0.05$, the output is 5V.

By solving, the numbers for N1 and N2 come out as follows:
N1=977
N2=884

The pulse period or frequency can be computed as follows:
For the configuration of FIG. 2, the pulse period is given by $$Ts = N(T1 + T2) = N[(To + \Delta T) + (To - \Delta T)] = 2NTo = 2 \times 1024 \times 0.2 \times 10^{-6} \cong 0.4 \times 10^{-3} \text{ seconds}$$

The frequency of the pulses is $$Fs = \frac{1}{T_s} = 2500 \text{ Hz}$$

For the configuration of FIG. 3, the pulse period is given by $$Ts = \frac{N(T1 + T2)}{K} = \frac{2NTo}{K} = \frac{2 \times 1024 \times 0.2 \times 10^{-6}}{11}$$
$$= 0.036 \times 10^{-3} \text{ seconds}$$

And the frequency of the pulses $$Fs = \frac{1}{Ts} = 27,500 \text{ Hz}$$

We claim:
1. Sensor amplification and enhancement apparatus for obtaining an amplified enhanced output from a sensor, indicative of the position of a movable member, comprising:
complementary impedance means coupled to said member to provide a first impedance and a second complementary impedance for each movable position of said member, whereby as one impedance increases by a given amount due to said movement, the other decreases by the same given amount, means including an oscillator responsive to said first and second impedances to provide first and second signals each having a different period determined according to the magnitude of said first and second impedances,
digital logic means responsive to said first and second signals for providing an output signal indicative of the difference in duration of said periods as divided by the sum of said periods and including means for expanding the duration of said signal to provide an expanded output signal having an effective gain factor according to the degree of expansion.

2. Sensor amplification and enhancement apparatus for obtaining an amplified enhanced output from a sensor indicative of the position of a movable member comprising:
complementary reactance means coupled to said member to provide first and second reactances, namely, a first reactance of a given value for a movable postion and a second reactance of a complementary value for said movable position, whereby as one reactance increases in value due to movement, the other reactance decreases by the same given value for said movement,
an oscillator coupled to said complementary reactance means and including means for selecting said first reactance to control said oscillator in a first mode and said second reactance in a second mode, to provide a first output period during said first mode indicative of the first reactance value and a second output period during said second mode indicative of said second reactance value,
digital logic means coupled to said oscillator and operative to provide an output indicative of the difference in the duration of said first and second periods during a given timing interval,
means including a divider coupled to said digital logic means to cause said logic means to provide at an output a signal indicative of the difference of said first and second periods as divided by the sum of said first and second periods with said signal further characterized by having an amplification factor determined according to the division factor of said divider.

3. The apparatus according to claim 2, wherein said movable member is a shaft, with said complementary reactances being first and second planar coils mounted on a board having a central aperture for accommodating said shaft, with said shaft having secured thereto a spoiler member whereby as said shaft is rotated, said spoiler member rotates to complementarily vary the inductance of said first coil with respect to said second coil.

4. The apparatus according to claim 2, wherein said means included in said oscillator includes a counter having an input coupled to the output of said oscillator and operative to select said reactances to count said oscillator output for N output pulses from said oscillator in said first and second modes to provide an output count indicative of a period (Ts) of a complete counting cycle equal to:

$$Ts = N(T1 + T2)$$

T1 is the period of said oscillator frequency in said first mode
T2 is the period of said oscillator frequency in said second mode.

5. The apparatus according to claim 2, wherein said digital logic means includes an up-down counter including a clock source for controlling the rate of counting with said up-down counter having an input coupled to said oscillator means, first counter means coupled to said up-down counter and responsive to said divider output to cause said first counter means to provide at an output said signal having an amplification factor determined according to the division factor of said divider.

6. The apparatus according to claim 5, further including, first and second comparators coupled to said first counter with said first comparator operative to detect when said counter reaches N1 counts of T1 with said second comparator operative to detect when said counter reaches N2 counts of T2, with the output of said first comparator coupled to the down-count input of said up-down counting means and with the output of said second comparator coupled to the up-count input of said up-down counting means to cause said up-down counting means to first count down for a period equal to the duration of N1 pulses and up for a duration of N2 pulses.

7. The apparatus according to claim 6, wherein said clock source for controlling the rate of said down-up counting means is an oscillator having an output frequency of Faux whereby the count ($\Delta N$) in said down counting means after a complete cycle is:

$$\Delta N = (-N1 T1 + N2\ T2)\ Faux$$

8. The apparatus according to claim 7, wherein said counting means as coupled to said down-up counting means is preset with said count ($\Delta N$) in said down counting means to cause said counter to count up by said divided clock frequency Fck/k, where K is the division factor of said divider and is a positive integer to cause said counter to reach its terminal count in a time Tx, where $$Tx = K\ (N1 T1 - N2 T2)$$

9. The apparatus according to claim 8, further including a lowpass filter coupled to the output of said counting means to provide a pulse train having a pulse width of Tx and repetition rate of Ts.

10. The apparatus according to claim 2, further including:
means coupled to said oscillator for turning said oscillator on and off during operation.

11. The apparatus according to claim 9, wherein said counting means includes a first counter having an input coupled to said multiplexing means and an output coupled to a latch for storing therein a count indicative of the sum of said first and second periods according to said divided clock signal, means for inverting said count as stored and applying said inverted count as a preset to a second counter during the off period of said oscillator, with said second counter enabled to count according to said clock source, comparator means for comparing the count in said second counter with the count in said down-up counting means to provide said output indicative of the difference in said first and second periods as divided by the sum of the same with said signal further having a gain factor according to said division factor of said divider.

12. The apparatus according to claim 11, further including a third counter coupled to the output of said second counter and operative to divide the count stored in said second counter by a given integer to provide an output signal operative to turn said oscillator on and off according to said output signal.

13. The apparatus according to claim 1, wherein said digital logic means means further includes a flip-flop having a first state for selecting said first mode and a second state for selecting said second mode.

14. Sensor amplification and enhancement apparatus for obtaining an amplified enhanced output from a sensor indicative of the position of a movable member, comprising:
complementary reactance means coupled to said member to provide a first reactance of a given value for a first movable position of said member and to provide a second reactance of a complementary value for said same position whereby as one reactance increases in value, the other reactance decreases by the same given amount for said movement,
means coupled to said reactance means to select said first reactance in a first mode and said second reactance in a second mode, an oscillator coupled to said reactance means and operative to provide a first signal of a given period in said first mode according to the value of said first reactance, and a second signal of another period in said second mode according to the value of said second reactance,
first counting means coupled to said oscillator and operative to provide a count indicative of a given number of pulses during said first mode and of a different number of pulses during said second mode,
comparison means coupled to said first counting means and operative to provide a first output signal for a predetermined number of pulses during said first mode and a second output signal for a predetermined number of pulses during said second mode,
up-down counting means coupled to said comparison means and operative to count in a first direction according to said first signal and in a second direction according to said second signal to provide at an output a count indicative of a difference value between said periods,
logic means including a divider coupled to said up-down counting means responsive to said count for providing an output signal proportional to the difference of said first and second periods as divided by the sum of said first and second periods and having an effective amplification factor according to the division factor of said divider.

15. The apparatus according to claim 14, wherein said logic means includes a first counter having an input coupled to the output of said up-down counting means and operative to count at a rate determined by said divider.

16. The apparatus according to claim 13, further including means for pulsing said oscillator on and off during operation.

17. The apparatus according to claim 14, wherein said comparison means includes first and second compartors each operative to provide said predetermined number of pulses during said first and second modes.

18. The apparatus according to claim 15, wherein said first comparator provides said first output signal for the sum of said first and said second periods during said first mode, with said second comparator providing said second output signal for the difference of said first and second periods during said second mode.

19. A digital sensor interface apparatus, for operation in conjunction with sensors, consisting of at least two sensing elements, which lend themselves to a complementary variable frequency operation, whereby the frequency of one sensing element is increased by a given amount while the other decreases by the same amount as a result of a change in the sensor input parameter, digital logic means for generating an output signal consisting of a series of pulses with a duty cycle representing the ratio between the difference of the frequencies of the two sensing elements to their sum, digital logic means for increasing said duty cycle of said output pulses to provide an apparent output amplification.

20. The digital sensor interface according to claim 19, wherein said sensors are planar coil sensors positioned with respect to a movable member so that an increase in reactance is accompanied by a decrease in reactance of the other in a complementary manner.

* * * * *